Figure 1:
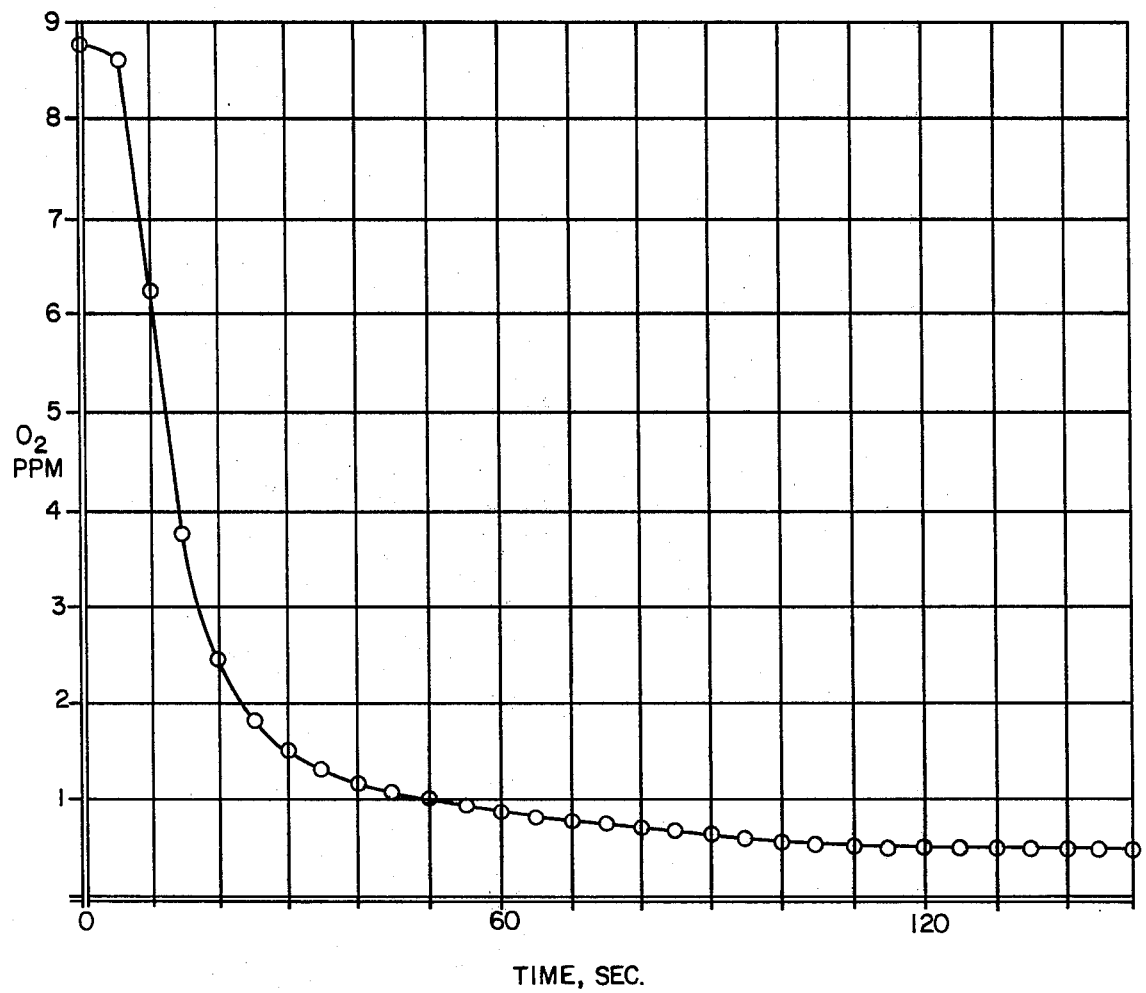

United States Patent [19]

Slovinsky

[11] 4,311,599
[45] Jan. 19, 1982

[54] REDUCED METHYLENE BLUE FOR OXYGEN REMOVAL

[75] Inventor: Manuel Slovinsky, Woodridge, Ill.

[73] Assignee: Nalco Chemical Company, Oak Brook, Ill.

[21] Appl. No.: 206,320

[22] Filed: Nov. 12, 1980

[51] Int. Cl.³ .......................... C02F 1/58; C23F 11/04
[52] U.S. Cl. ..................................... 210/757; 252/178; 422/16; 159/DIG. 13
[58] Field of Search ....................... 210/757, 749, 750; 252/178, 391, 393–395, 401, 402, 404–406; 422/16, 17; 159/DIG. 13, DIG. 20

[56] References Cited
U.S. PATENT DOCUMENTS 3,257,160  6/1966  Zimmermann et al. .............. 422/16
4,071,450  1/1978  Paul ................................. 210/912 X
4,279,767  7/1981  Muccitelli ......................... 422/16 X Primary Examiner—Thomas G. Wyse
Attorney, Agent, or Firm—John G. Premo; Robert A. Miller

[57] ABSTRACT

An improved method for scavenging dissolved oxygen from alkaline waters which comprises treating said waters with at least 10 ppm of methylene blue in its reduced or leuco base form.

1 Claim, 1 Drawing Figure

TIME, SEC.
PH: 10.7  T: 25°C  200 PPM ACTIVE
REACTION WITH DISSOLVED OXYGEN
METHYLENE BLUE LEUCOBASE

REDUCED METHYLENE BLUE FOR OXYGEN REMOVAL

INTRODUCTION

Dissolved oxygen in water is undesirable when such waters are used in industrial applications. Oxygen containing waters cause corrosion in such industrial equipment as boilers, heat exchangers, and oil well equipment.

A common method of combating this problem is to scavenge oxygen with chemicals. The invention deals with an improved chemical for scavenging oxygen that is efficient and is organic and readily available.

THE INVENTION

In accordance with the invention, it has been found that oxygen may be scavenged from alkaline waters by using from about between 10 up to about 1000 ppm by weight in the water of methylene blue, (3,7-Bis(dimethylamino)phenothiazin-5-ium chloride,) when used in its reduced or leuco base form.

The invention requires that the pH of the water being treated be greater than 7 with a preferred pH being 9 or greater.

TEST METHOD AND EVALUATION OF THE INVENTION

A four neck 500 ml reaction flask was fitted with a small rubber septum, a three-way connecting tube holding a thermometer and a venting stopcock, a stopcock connected to a funnel and an Orion Research oxygen electrode, Model 97-08. This oxygen electrode is connected to a pH meter in the prescribed manner for direct reading of the oxygen concentration. The flask is filled through the funnel with air-saturated water obtained by bubbling air through water at room temperature for two hours, making sure that no air is trapped in the flask. The stopcocks are closed. The oxygen content of this water is 8–9 ppm. The solution of the oxygen scavenger candidate is then injected into the magnetically stirred water with a syringe through the septum cap and readings of the oxygen concentration are made every 5 seconds, after injecting 0.25 ml of 25% NaOH to take pH to 10.7

The following results were obtained:

|  | Concentration (ppm) | %* Oxygen Decrease** |
|---|---|---|
| Methylene blue (reduced leuco base) | 1 | 1 |
| | 10 | 12 |
| Methylene blue (reduced leuco base) | 200 | 94 |

*based on average initial oxygen concentration: 8.43 ppm
**after one minute

The drawing shows oxygen reduction using 200 ppm of reduced methylene blue.

Having thus described my invention, it is claimed as follows:

1. An improved method for scavenging dissolved oxygen from alkaline waters which consisting essentially of treating said waters with at least 10 ppm of methylene blue in its reduced or leuco base form.

* * * * *